United States Patent [19]

Kimpton et al.

[11] Patent Number: 5,789,511
[45] Date of Patent: Aug. 4, 1998

[54] METHODS FOR MAKING STYRENE COPOLYMERS AND USES THEREOF

[75] Inventors: Paul T. Kimpton, Northants; Robert W. Hodgetts, Coventry, both of Great Britain

[73] Assignee: National Starch and Chemical Investment Holding Corporation, Wilmington, Del.

[21] Appl. No.: 824,935

[22] Filed: Mar. 26, 1997

Related U.S. Application Data

[62] Division of Ser. No. 505,436, Jul. 21, 1995, Pat. No. 5,650,473.

[30] Foreign Application Priority Data

Jul. 22, 1994 [GB] United Kingdom ............ 9414853
Jun. 10, 1995 [GB] United Kingdom ............ 9511880

[51] Int. Cl.$^6$ ........................................... C08F 20/06
[52] U.S. Cl. ............................ 526/318.6; 524/824
[58] Field of Search ............... 526/318.6; 524/824

[56] References Cited

U.S. PATENT DOCUMENTS

| | | | |
|---|---|---|---|
| 3,035,033 | 5/1962 | Schweitzer, Jr. et al. | 260/88.1 |
| 3,983,268 | 9/1976 | Scharf et al. | 427/341 |
| 4,195,169 | 3/1980 | Priddy | 528/500 |
| 4,481,244 | 11/1984 | Haruta et al. | 428/155 |
| 4,628,071 | 12/1986 | Morgan | 524/832 |
| 4,937,298 | 6/1990 | Miura et al. | 525/66 |
| 5,122,568 | 6/1992 | dePierne et al. | 524/824 |
| 5,138,004 | 8/1992 | dePierne et al. | 526/293 |
| 5,326,843 | 7/1994 | Lorah et al. | 525/318.6 |

FOREIGN PATENT DOCUMENTS

| | | | |
|---|---|---|---|
| 0 636 687 A2 | 2/1995 | European Pat. Off. | C11D 3/37 |
| 27 57 329 | 6/1979 | Germany | C08F 20/06 |
| 47-606 | 1/1972 | Japan . | |
| 1107249 | 8/1965 | United Kingdom | C08F 19/00 |
| WO 94/26858 | 11/1994 | WIPO . | |

*Primary Examiner*—Joseph L. Schofer
*Assistant Examiner*—N. Sarofin
*Attorney, Agent, or Firm*—William K. Wissing; John D. Thallemer

[57] ABSTRACT

A polymer comprising styrene or substituted-styrene and carboxylated monomer is prepared by a solution polymerization process, comprising first a polymerization step, followed by a neutralization step, and then a distillation step. The polymers have relatively low molecular weights, generally below about 10,000, and can have higher styrene content than has hither been possible. The polymers are found to have good soil release properties and so to be particularly useful in cleaning compositions for fabric or hard surface cleaning.

11 Claims, No Drawings

METHODS FOR MAKING STYRENE COPOLYMERS AND USES THEREOF

This application is a division of application Ser. No. 08/505,436, filed Jul. 21, 1995, now U.S. Pat. No. 5,650,473.

FIELD OF INVENTION

This invention relates to styrene copolymers and concerns a novel method for their production and their use in a wide range of compositions including cleaning compositions.

BACKGROUND OF THE INVENTION

European Patent 0 636 687 (National Starch & Chemical Ltd.) describes a method for the preparation of styrene/acrylic polymers, optionally including a minor amount of n-dodecyl mercaptan (DDM) by a solution polymerization process involving polymerization, distillation and then neutralization steps. Acrylic acid is preferably present in an amount in the range 50 to 80% by weight, styrene 20 to 50% by weight and DDM up to 1% by weight in the resulting polymer product. It is not, however, possible to make polymers with higher styrene content by this process.

U.S. Pat. No. 5,122,568 (American Cyanamid) describes a process for preparing styrene/acrylic type polymers involving a solution polymerization step followed by simultaneous neutralization and distillation. Not more than 20 weight percent of acid moieties may be neutralized prior to initiation of distillation. The resulting polymers have a weight average molecular weight of at least 30,000 and are useful in the sizing of paper. Polymers having a styrene:acrylic acid monomer ratio of up to 1.4:1 can be prepared in this way.

U.S. Pat. No. 5,326,843 (Rohm and Haas) describes an emulsion polymerization process for producing alkali-soluble copolymers of methacrylic acid and water-insoluble, monoethylenically unsaturated aromatic monomer such as styrene. The resulting emulsion polymers have weight average molecular weights in the range 2,000 to 40,000 and can include up to about 75% by weight of styrene.

Great Britain Patent 1 107 249 (Johnson) describes a solution polymerization process for preparing styrenelacrylic acid and similar polymers, including use of non-water-miscible solvents such as methyl isobutyl ketone, toluene, etc. The polymers have a number average molecular weight in the range of 700 to 5,000. The mole ratio of styrene to acrylic acid is in the range 3:1 to 1:1. After reaction, residual solvent may have to be removed.

SUMMARY OF THE INVENTION

According to the present invention there is provided a solution polymerization method of preparing a polymer comprising the polymerized residue of a monomer selected from the group consisting of styrene and substituted-styrene monomer and a carboxylated monomer, the method comprising the steps of (a) polymerizing the styrene and/or substituted-styrene monomer and the carboxylated monomer in the presence of a water-miscible solvent to form a polymer solution containing acid moieties, (b) neutralizing an amount of the acid moieties in the polymer solution effective to maintain the solubility of the polymer in the polymer solution throughout the solution polymerization, and then (c) removing the water-miscible solvent from the polymer solution.

DETAILED DESCRIPTION OF THE INVENTION

By reversing the order of the neutralization and solvent removal steps of the process as disclosed in EP 0 636 687, it is possible to produce stable polymers of higher styrene content (possible comprising up to about 90% by weight styrene) than has hitherto been possible. The method is nevertheless applicable to polymers of lower styrene content, as can currently be made by conventional techniques.

The method of the invention is also to be contrasted with that of U.S. Pat. No. 5,122,568 in which neutralization and solvent removal are carried out substantially simultaneously. Surprisingly, it is found by neutralizing the acid moieties prior to solvent removal to a sufficient extent to maintain the solubility of the polymer in the polymer solution during the solution polymerization process, particularly during the solvent removal step, so that further neutralization is not essential, it is possible to produce stable polymers of higher styrene content than has hitherto been possible. As noted above, the method is nevertheless applicable to polymers of lower styrene content.

The proportion of the acid moieties that need to be neutralized in step (b) varies depending on the styrene content of the monomer mix, with higher proportions being required at higher styrene levels. For polymers containing less than about 35 weight of styrene and/or substituted-styrene, neutralization may be conducted prior to the removal of the water-miscible solvent from the polymer solution. However, for polymers containing 40 weight percent or more of styrene and/or substituted-styrene, it has been found that a certain minimum amount of the acid moieties must be neutralized prior to the initiation of the removal of the water-miscible solvent in order effectively to maintain the solubility of the polymer in the polymer solution throughout the remainder of the solution polymerization process. If the minimum effective amount is not neutralized prior to solvent removal, the polymer will become insoluble in the polymer solution during the solvent exchange, i.e., replacing the water-miscible solvent with water during distillation. Once the polymer becomes insoluble, additional neutralizing base must be added in order to complete the distillation step. Once armed with the disclosure of this specification, one skilled in the art will be able to determine by experiment the proportion of acid moiety which must be neutralized prior to renioval of the water-miscible solvent. In all cases, it is preferred to neutralize at least 30 weight percent of the acid moieties in step (b). Where the styrene content is in the range 50 to 90 weight percent, at least 50 weight percent of the acid moieties are preferably neutralized in step (b), and where the styrene content is in the range 60 to 90 weight percent, at least 75 weight percent of the acid moieties are preferably neutralized in step (b).

It is preferred that substantially all of the neutralization takes place prior to solvent removal so that no further neutralization is required, and in a typical case at least 85% of the acid moieties preferably are neutralized in step (b), provided sufficient neutralization takes place to maintain polymer solubility during the solvent removal step, and additional neutralization of "unneutralized" acid moieties may be conducted during or after solvent removal, if desired.

The polymer prepared according to the invention typically comprises at least 90% by weight of the polymerized residue of the styrene and/or substituted-styrene monomer and the carboxylated monomer, with any balance possibly comprising minor amounts of optional further monomer, e.g., DDM. Such optional monomers may be included to produce a product with enhanced solubility, or other desired properties.

The styrene or substituted-styrene preferably comprises about 40 to 90% by weight of the total monomer used to prepare the polymer product, preferably 50 to 90%, and more preferably 75 to 90%. As used herein, substituted-styrene is intended to include styrene monomers wherein alkyl groups are substituted either onto the ethylenic chain or the aromatic ring of the styrene molecule. Exemplary substituted-styrene monomers include alpha-methyl styrene and vinyl toluene.

The carboxylated monomer typically comprises acrylic acid, substituted-acrylic acid, e.g., methacrylic acid, maleic acid or half-esters thereof, crotonic acid or itaconic acid, and preferably comprises about 10 to 60% by weight of the total monomer used to prepare the polymer product, preferably 10 to 50%, and more preferably from 10 to 25%.

One preferred polymer product comprises the polymerized residue of at least 90% by weight of acrylic acid and styrene.

The maximum molar ratio of styrene:acrylic acid achievable by the method of the invention is about 5:1 on a weight basis. This corresponds to about 88% styrene and 12% acrylic acid.

The method of the invention enables production of stable liquid polymers, possibly having higher styrene content than previously possible (including the range 75 to 90% by weight).

The invention thus also includes within its scope a polymer produced by the method of the invention, particularly polymers having greater than 75% by weight styrene.

In another aspect the invention provides a polymer comprising styrene and/or substituted-styrene and carboxylated monomer, having a weight average molecular weight below about 10,000 and styrene content in the range 75 to 90% by weight.

The polymerization preferably is carried out using one or more water-miscible solvents, preferably in aqueous solution. Suitable solvents include low molecular weight alcohols such as methanol, ethanol, propanol, isopropanol, ethers such as dimethyl ether, esters such as ethyl acetate and others such as acetone, methyl ethyl ketone. Other suitable water-miscible solvents will be apparent to those skilled in the art. Isopropanol/water mixtures currently are preferred.

Typical physical, and therefore application, properties of the polymers depend on factors including the ph of the polymer solution and the molecular weight of the polymer solution. It should be noted that the polymers of the present invention are manufactured in the form of aqueous solutions.

Below pH 7 the polymers are generally insoluble in aqueous media. Above this pH, at pH 7.5 to 8 approximately, polymers containing above about 20% acrylate become soluble. Accordingly, the pH of the solution polymers preferably are prepared at pH of from about 7 to 9 by neutralizing acid moieties in the polymer solution.

The solubility of the polymers in aqueous media is reduced by increasing the molecular weight of the polymer, as might be expected. Typically polymers of the present invention have weight average molecular weights in the range about 500 to about 500,000, preferably about 500 to 10,000.

The solubility of the polymer also appears to be strongly affected by the type of initiator used during the manufacture of the polymer. The more hydrophobic polymers, typically those containing greater than 60% w/w of styrene can by made using thermal initiators, whereas those polymers containing 40 to 60% w/w styrene must be made using only redox initiators.

There are certain applications for which polymers with high styrene content are desirable. Styrene is hydrophobic and so enhances cleaning properties of the polymer product. The polymers made by the process of the invention have properties that make them useful as ingredients in a wide range of compositions.

In a further aspect the present invention thus provides a composition comprising a polymer which comprises the polymerized residue of 20 to 90 weight percent of a monomer selected from the group consisting of styrene and substituted-styrene and 80 to 10 weight percent of a carboxylated monomer, said weight percents based on the weight of the polymer.

Potential applications for polymer products of the invention include the following:

Dispersants for pigments in aqueous-based paints (silk, gloss) with good film forming properties and water-resistance.

Dispersants in aqueous inks.

Cement super plasticizers for concrete.

Plasticizers for tile adhesives and grouts.

Film formers in polishes (household and automotive).

Hair fixatives in hairsprays.

Anti-redeposition agents.

Protective colloids.

Emulsion/microemulsion stabilizers.

Calcium scale modifiers.

Corrosion inhibitors.

Polymers in accordance with the invention are unexpectedly found to have soil release properties, acting to release soil from the surfaces of materials including textiles, skin, hair, metals, plastics, woods, ceramics and other domestic and industrial hard surfaces.

One particularly important application for the polymer products of the invention is thus as soil release aids in laundry applications and textile treatments. The polymers are sufficiently hydrophobic to adsorb to cloth during a washing cycle or textile sizing process, yet have enough hydrophilic character to decrease the hydrophobic nature of fabric such as polyester. In particular, the polymers will precipitate onto cloth at pHs at which conventional sizing materials would be removed. The presence of the polymers will therefore reduce the amount of oily soil that can stick to the cloth. Subsequent washing of the cloth will remove more soil as a result of the reduced interactions between soil and cloth. The polymer product can thus to advantage be incorporated in laundry products and textile treatment products.

The polymers of the invention also find particular application as ingredients of cleaning compositions for a wide range of household, institutional and industrial applications, particularly fabric and hard surface cleaning compositions, such as heavy and light duty liquid detergents, fabric washing detergents, fabric conditioner products, automatic and manual dishwasher detergents, multi surface cleaners, personal cleaning products, etc.

Such cleaning compositions preferably include non-ionic surfactant, desirably an alcohol ethoxylate. Preferred alcohol ethoxylates have HLB (hydrophobic-lipophilic balance) values between 6 and 20. Examples of such materials are:

| HLB | SURFACTANT TYPE | TRADENAME |
|---|---|---|
| 6.9 | $C_{12-14}$ natural alcohols ethyoxylated with 3 moles of ethylene oxide | eg: Empilan KB3 |
| 8.1 | $C_{9-11}$ synthetic alcohols ethyoxylated with 2.5 moles of ethylene oxide | eg: Dobanol 91 + 2.5 |
| 12.5 | $C_{9-11}$ synthetic alcohols ethoxylated with 6 moles of ethylene oxide | eg: Dobanol 91 + 6 |
| 12.0 | $C_{12-15}$ synthetic alcohols ethoxylated with 7 moles of ethylene oxide | eg: Dobanol 25 + 7 |
| 12.6 | $C_{12-16}$ natural alcohols ethoxylated with 8 moles of ethylene oxide | eg: Empilan KC8 |
| 16.0 | $C_{12-18}$ natural alcohols ethoxylated with 20 moles of ethylene oxide | eg: Empilan KM20 |

Other non-ionic surfactants which may be used include alkylphenol ethoxylates, e.g., Ethylan BCP, sorbitan esters, e.g., Span 65, ethoxylated sorbitan esters, e.g., Tween 80, secondary alcohol ethoxylates, e.g., Tergitor 15S9 and low foaming modified non-ionic surfactants such as Plurafac LF131. Surfactant choice is governed primarily by performance. Lower HLF surfactants are good wetting aids and emulsifiers whilst higher HLP surfactants are effective as solubilizers and at removing oily and particulate soils. Any of the above may be selected for use bearing this in mind along with other properties such as foaming, stability at various pHs.

A single non-ionic surfactant or a mixture of such surfactants may be used.

A synergistic effect is observed between the polymers and alcohol ethoxylates, giving enhanced cleaning and soil removal properties. Alcohol ethoxylates are widely used in cleaning compositions, and the cleaning performance of such compositions can thus be enhanced by adding a suitable amount of the polymer, possibly in place of a proportion of the alcohol ethoxylate.

The composition may additionally include other ingredients such as these conventionally found in cleaning compositions. For example, the composition may include one or more anionic surfactants, e.g., sulphates and sulphonates, provided these are present in an amount by weight that is less than the amount of non-ionic surfactant. In this context, references to anionic surfactants exclude soaps and amphoteric surfactants.

The polymer is preferably present in cleaning compositions in an amount of from 1 to 10% by weight, more preferably 2 to 5% by weight.

In another aspect the invention provides a method of improving soil release properties of a cleaning composition, comprising adding to the cleaning composition 1 to 10 weight percent of a polymer comprising the polymerized residue of 20 to 90 weight percent of a monomer selected from the group consisting of styrene and substituted-styrene, 80 to 10 weight percent of a carboxylated monomer and 0 to 1 weight percent of DDM, said weight percents based on the weight of the polymer.

The invention also includes within its scope use of the polymer comprising the polymerized residue of 20 to 90 weight percent of a monomer selected from the group consisting of styrene and substituted-styrene, 80 to 10 weight percent of a carboxylated monomer and 0 to 1 weight percent of DDM as a soil release agent, particularly in cleaning compositions.

The invention will be further described, by way of illustration, in the following examples.

EXAMPLE 1

A polymer comprising about 25% by weight acrylic acid, about 75% by weight styrene and up to about 1% by weight DDM was made by the following procedure.

An initial charge of deionized water (140 g) and isopropyl alcohol (240 g) was added to a 1 liter glass reactor fitted with the lid which has inlet ports for an agitator, water cooled condenser and for the addition of monomer and initiator solutions. The reactor contents were heated to reflux (approximately 86° C.).

At reflux continuous additions of monomers (103 g acrylic acid, 297 g styrene+1 g DDM) and initiator solutions were added to the reactor concurrently with stirring over 3 hours and 3.5 hours respectively. Initiator solutions were as follows:

| Catalyst (slow-add 1) | | |
|---|---|---|
| t-butyl hydroperoxide | 40 g | |
| Isopropyl alcohol | 20 g | Add over 3.5 hours |
| Deionized water | 20 g | |
| Catalyst (slow-add 2) | | |
| Formasul (sodium formaldehyde sulphoxylate | 16 g | Add over 3½ hours |
| Deionized water | 80 g | |

At the end of the initiator slow-addition a 47% aqueous sodium hydroxide solution (100 g) was added to yield a polymer solution having a final pH of approximately 7 to 8. The reaction temperature was maintained at reflux for a further 1 hour to eliminate any unreacted monomer.

After the 1 hour hold the alcohol co-solvent was removed from the polymer solution by azeotropic distillation under vacuum. During the distillation, deionized water was added to the polymer solution to maintain a reasonable polymer viscosity.

Once the distillation stage has been completed, the aqueous solution of an acrylic acid/styrene/n-dodecyl mercaptan copolymer was cooled to less than 30° C. and transferred to storage.

The resulting product was an aqueous solution of composition given above, with a weight average molecular weight of about 750, being substantially non cross-linked and having a solids content of 33.6. Molecular weights in this and the following Example were measured by GPC using sodium polyacrylate standards.

EXAMPLE 2

A number of further polymers with different ratios of acrylic acid:styrene were made using the method of Example 1. Details of the polymers are given in the following Table, including residual monomer and solvent values.

| Polymer Code | AA:Styrene | Weight average mol wt (Mw) | No. average mol wt (Mn) |
|---|---|---|---|
| 499/23 | 1:4 | Results not accurate | |
| 499/24 | 1:3 | Results not accurate | |
| 494/13 | 1:1.7 | 500 | 260 |
| H100 | 1:5.1 | 7900 | 1720 |

| | | | |
|---|---|---|---|
| 400/18 | 2:1 | 2780 | 370 |
| 400/19 | 3:1 | 3800 | 680 |
| 499/20 | 4:1 | 4990 | 1368 |

| | Residual (% w/w) | | |
|---|---|---|---|
| Polymer Code | acrylic acid | styrene | Isopropanol |
| 499/23 | 0.41 | 0.014 | 0.147 |
| 499/24 | 0.151 | 0.001 | 0.029 |
| 494/13 | — | 0.004 | 0.29 |
| H100 | 0.69 | 0.002 | 0.001 |
| 400/18 | 0.007 | 0.001 | 0.003 |
| 400/19 | 0.008 | 0.001 | 0.001 |
| 499/20 | 0.008 | 0.001 | 0.001 |

Experiments were carried out to test the polymers as emulsion/microemulsion stabilizers, soil release polymers, calcium scale modifiers, soil removal aids and corrosion inhibitors. Test details and results are given below.

EXAMPLE 3

Emulsion/Microemulsion Stabilizers

Emulsions were prepared by high shear mixing oils, surfactants, polymer and water at ambient temperature for 15 minutes in order to determine the ability of the polymers to stabilize oil/water emulsions to modify the stabilizing performance of a simple laundry surfactant.

a) Hydrophilic Oils, e.g., Octanol

Three series of emulsions of 1, 2, 4, 6 8 and 10% w/w octanol were made in deionized water or 1.0M sodium chloride solution and stabilized with 0, 2 or 4% Synperonic A7 (seven mole $C_{13-15}$ alcohol ethoxylate) (Synperonic is a trademark). To two of these series, 0.5% w/w active H100 or 494/13 polymer was added prior to mixing. Stability with time was observed at ambient and elevated temperature.

Coalescence of oil droplets in emulsions were observed in both deionized water and brine on the addition of polymer. The more hydrophobic polymer 494/13 gave emulsions with better stability against coalescence. For example, a microemulsion of 1% octanol and 2% Synperonic A7 was disrupted by the addition of 0.5% w/w active H100 so that a three phase system formed comprising of an oil layer, an opaque aqueous layer and a clear lower aqueous layer. In contrast, the addition of 0.5% w/w 494113 to an emulsion of 1% octanol and 4% Synperonic A7 produced a clear microemulsion.

b) Hydrophobic oils, e.g., olive oil

20% w/w olive oil emulsion were stabilized with 5 or 10% w/w polymer chosen from 499/24, 23, 18, 19 and 20.

Visual comparison of stability was made after several days using a microscope.

Emulsions prepared using the higher styrene copolymers 499/22 and 23 creamed over the storage period although they showed no tendency to coalescence (oil separation). Droplet sizes were uniform in both the cream and bulk of the emulsion. These systems were equivalent in performance to existing surfactant-based systems.

Emulsions prepared using the acrylic-rich copolymer showed an increase in coalescence with increasing acrylic acid content at both levels of incorporation.

Potential applications of the polymers include the following: as fragrance solubilizers in detergents, as emulsifiers in liquid soaps and skin care formulations, as emulsifiers in cutting fluids, (particularly combined with their anti-corrosive and anti-scaling properties), as emulsifiers in agro-chemical formulations, as colloid stabilizers in polymer latex production in combination with linear alcohol ethoxylates to replace nonylphenyl ethoxylates, additionally giving improved filing water resistant properties, as encapsulants for fragrances.

EXAMPLE 4

Corrosion Inhibitors, particularly on aluminum

To determine the ability of the polymers to reduce corrosion by adsorption at the surface of metal, the following experiments were carried out.

A small piece of kitchen foil was placed in a 2% solution of sodium hydroxide at 60° C. and the time taken for dissolution of the aluminum measured. Polymer levels were set at 0.1% active.

The following results were obtained.

| Polymer | Acrylic Acid: styrene | Time (mins) taken for foil to dissolve compatibility |
|---|---|---|
| None-control | — | 2.35 (no residues) |
| 499/18 | 2:1 | 18:26 |
| 499/19 | 3:1 | 5:01 |
| 499/20 | 4:1 | 5:21 |
| 499/22 | 1:3 | 30:00 + (slight residue formed) |
| 499/23 | 1:4 | 30:00 + |

The polymers may therefore have an anti-corrosive effect if incorporated into certain laundry products and can be used to replace highly alkaline silicates, e.g., in automatic dishwashing powders. The anti corrosive properties mean the polymers may also be useful in other applications including in cutting fluids, surface coatings, e.g., paints, lacquers; as fixatives in aqueous hairsprays giving reduced can corrosion.

EXAMPLE 5

Scale modifiers/calcium binders

Measurements of calcium binding capacity were made on H100 and 494/13 using the Hampshire Test Both polymers had low binding capacities (43.7 mg and 33.8 mg $CaCO_3$ per g of polymer) compared to homopolymers of acrylic acid of a similar molecular weight (about 320 mg $CaCO_3$ per g of polymer).

The acrylic-rich polymers do exhibit some ability to prevent the formation calcium scale under dynamic test conditions, making them useful additives for a number of detergent and industrial applications.

Results:

| Polymer | % scale inhibition at a dose of 10 ppm active polymer |
|---|---|
| 499/18 | 40.7% |
| 499/19 | 73.0% |
| 499/20 | 96.8% |
| 499/24 | <5% |

EXAMPLE 6

Enhancing wash Performance:

As both high and low styrene-containing polymers have strong interactions with non-ionic alcohol ethyoxylate surfactants in electrolyte solution, they can be used to increase the soil removal performance of the surfactants under wash conditions. The soil removal figures of polymer and surfactant combinations are higher than the figures for polymer or surfactant alone and therefore the combinations are strongly synergistic.

Wash conditions

Temperature: 40° or 60° C.

Wash liquor: 13.51

Water hardness: 250 ppm $CaCO_3$

Cloth: Polyester:cotton soiled with pigment/sebum wfk 20C and 20D

Different detergent doses were used as follows:
1. 1.2 g/l Synperonic A7
   0.8g/l Sodium carbonate
2. 1.2 g/l Synperonic A7
   0.8g/l Sodium carbonate
   0.25 g/l 494/13 polymer
3. 1.2 g/l Synperonic A7
   0.8 g/l Sodium carbonate
   0.25g/l H100 polymer
4. 0.8 g/l Sodium carbonate
   0.25 g/l H100 polymer
5. 0.8 g/l Sodium carbonate Details of the wfk test cloths used are:

| Cloth Code | Type | Soil Type |
| --- | --- | --- |
| wfk 20D | Polyester/cotton (65:35) | synthetic pigment + synthetic sebum |
| wfk 20C | Polyester/cotton (65:35) | synthetic pigment + lanolin |

The cloths are supplied by wfk Forschungsinsitute, Krefeld, Germany.

Results

|  | Reflectance wfk 20C | Reflectance wfk 20D |
| --- | --- | --- |
| Washes at 40° C. | | |
| 1. No polymer | 43.7 | 61.8 |
| 2. 494/13 | 44.0 | 66.4 |
| 3. H100 | 44.7 | 65.6 |
| 4. No surfactant | 37.0 | 46.6 |
| 5. No polymer or surfactant | 36.7 | 46.6 |
| Standard deviation ~2 reflectance units. | | |
| Washes at 60° C. | | |
| 1. No polymer | 52.0 | 63.4 |
| 2. 494/13 | 59.5 | 70.2 |
| 3. H100 | 59.0 | 69.9 |
| 4. No surfactant | 38.0 | 46.4 |
| 5. No polymer or surfactant | 38.0 | 46.2 |

In the above tables, higher reflectance figures indicate lighter and hence cleaner cloths.

Combinations of polymer and alcohol ethoxy late can be used cost-effectively to replace more expensive surfactants in fabric powders, hard surface cleaners, metal scourers, etc.

EXAMPLE 7

Soil Release Aids:

The ability of the polymers to absorb to cloth during the wash cycle of a household washing machine to give a soil-repellent coating was determined as follows:

Using a commercially available compact powder (without polycarboxylates, enzymes, bleaches and anionic surfactants) containing 4% of each polymer, cotton swatches were washed 3 times at 60° C. in 250 ppm $CaCO_3$ hardness water. Detergent dose was 5 g/l. Half of the swatches were then soiled with a 1:1 olive oil:red iron oxide mixture, allowed to condition and then washed with the unsoiled swatches for a further 3 times in the same detergent formulation. Soil removal from the dirty cloth and transfer to the unsoiled cloth was assessed by reflectance measurement and percent soil removal values calculated.

Results:

| Polymer dosed at 4% | % soil removal from soiled cloth | Redeposition onto unsoiled cloth (Reflectance) |
| --- | --- | --- |
| Control-no polymer (4% sodium sulphate) | 11.4 | 83.5 |
| 499/19 | 23.1 | 85.3 |
| 499/20 | 26.6 | 86.1 |
| 499/24 | 13.2 | 86.4 |

Polymers may be used in heavy duty fabric washing powders, during textile production as anti-soiling agents, in surface coatings.

6. Examples of formulations a) Model laundry powder:

| Ingredient | % Active |
| --- | --- |
| Zeolite 4A builder | 25 |
| Sodium carbonate | 15 |
| Sodium citrate | 10 |
| Alcohol ethoxylate (7 mole EO) | 12 |
| Acrylic:styrene copolymer | 4 |
| Sodium disilicate | 3 |
| Sodium palm kernel fatty acid | 3 |
| Sodium carboxymethyl cellulose | 0.3 |
| Fragrance | 0.3 |
| Sodium sulphate | to balance |

The properties of the polymers mean they additionally have advantages when used for soil dispersancy, scale modification, to enhance primary soil removal, as anti-soiling agents, as fragrance encapsulating agents for oxidizable ingredients, as corrosion inhibitors.

b) Hard-surface bathroom cleaner:

| Ingredient | % w/w active A | % w/w active B |
| --- | --- | --- |
| Dobanol 25 + 9 | 7.00 | 7.00 |
| Tetrasodium EDTA | — | 2.00 |
| Potassium carbonate | 4.00 | 4.00 |
| Dowanol DPM | — | 5.00 |
| Polymer 499/18 | 1.00 | — |
| Water | to balance | |

Dobanol 25+9 is a $C_{12-15}$ synthetic alcohol ethoxylated with 9 moles of ethylene oxide (Dobanol is a trademark). Tetrasodium EDTA is tetrasodium ethylene diamine tetracetate, and acts as a sequestrant for calcium. Dowanol DPM is the solvent dipropylene glycol monomethyl ether and is available from Dow Chemical (Dowanol is a trademark).

Formulation B was prepared as a control and the performance of both formulation A and B compared to a commercially-available bathroom cleaning trigger spray, denoted formulation C. Use of polymer allows removal from such formulations of solvent and potentially harmful EDTA whilst improving overall performance with economy benefits.

i) Calcium scale dispersancy, i.e., ability to prevent scale deposits

One percent solution was titrated with 44 g/l of calcium acetate solution at pH 10. Turbidity was measured with increasing volume of calcium acetate added.

| Formulation | Turbidity (NTU) vs volume of calcium acetate added (cm³)lt | |
|---|---|---|
| | 2 | 4 |
| A | 7.4 | 750 |
| B | 4.6 | solution too turbid to measure |
| C | 3.5 | 4.0 | ii) Spray patterns using standard trigger spray:

There were no apparent differences between the 3 formulations.

iii) Foam tests: rapid decay preferable to reduce need for rinsing

| Formulation | Decrease in Foam Volume over 15 minutes |
|---|---|
| A | 20 cm³ |
| B | 8 cm³ |
| C | 90 cm³ |

The polymer thus aids foam collapse resulting in reduced) rinsing being required.

iv. Cloudpoint measurements: stability at elevated temperatures:

| Formulation | Cloud Point °C. |
|---|---|
| A | 53 |
| B | 53 |
| C | 53 |

All formulations have suitable stability at 40° C. Over periods of storage formulation B shows slight phase separation.

v) Particulate soil dispersancy: reduce redeposition of soil:

Iron oxide was dispersed with 0.5% detergent in hard water at pH 7.5 and allowed to settle. Turbidity was then measured at a fixed distance from surface.

| Formulation | Turbidity, NTU |
|---|---|
| A | 2.6 |
| B | 0.55 |
| C | 1.2 | iv) Detergency:

Aluminum surface soiled with 0.5 g of an iron oxide and olive soil, conditioned at 40° C. was sprayed in vertical position with a fixed volume of each formulation. The surface was rinsed with water and derived at 70° C. The percentage soil removal determined by weight difference of soiled and washed surface. The procedure was repeated to establish accuracy.

Results:

| Formulation | % soil removed |
|---|---|
| A | 5.2 |
| B | 5.8 |
| C | 7.8 |

EXAMPLE 8

The polymers are also useful in dishwasher products. A base automatic dishwasher powder from the literature was prepared and polymers incorporated at 4% w/w. The formulation was as follows:

| Ingredient | % w/w active |
|---|---|
| Sodium carbonate | 20.0 |
| Sodium citrate dihydrate | 12.5 |
| Zeolite 4A | 7.5 |
| Polymer or polymer mixture post added | 4.0 |
| Sodium silicate (2.4:1) | 7.0 |
| Sodium perborate tetrahydrate | 5.0 |
| Plurafac LF131 surfactant | 2.0 |
| Sodium sulphate | to 100% |

Highball tumbler glasses were then artificially soiled with a 4:1 margarine:dried milk powder and washed over two cycles in a household dishwasher in 250 ppm $CaCO_3$ water using formulation.

Once dry, the glasses were inspected visually for salt spotting (white rings) and fat filming. Any such residues indicated that the washing process has been incomplete.

Controls used were:

1. Powder+4% sodium sulphate
2. Powder+4% acrylic+maleic copolymer mol weight 70,000 (Narlex MA 340, Narlex is a trademark)
3. Powder+2% Narlex MA340+2% mol weight 5,000 homopolymer of acrylic acid, (Alcosperse 602N, Alcosperse is a trademark)
4. 4% Alcosperse 602N
5. A commercially available phosphate-built powder Styrene copolymers tested were 499/18, 499/20 and 499/24 all at 4.0% w/w and then at levels of 2% wlw with 2% Narlex MA340.

Results were as follows:

With control 1, organic filming and many white spots were observed.

With control 2, filming was prevented but some spotting evident.

With Control 3, again no filming but some spotting.

With Control 4, filming was absent but some spots were visible.

With Control 5, spotting and filming was eliminated. Glasses were clear.

With 4% 499/18, no filming, some limited spotting.

With 4% 499/20, no filming, fewer spots than with 499/18.

With 4% 499/24, some spots but noticeable filming.

With 2% 499118+2% MA340, very few spots and no filming. Glasses were clear.

With 2% 499/20+2% MA340, very few spots and no filming. Glasses were clear.

Overall, the use of mixtures of acrylic+maleic carboxylates and higher acrylic acid containing styrene copolymers gave better wash results than combinations of acrylic +maleic polymers and low molecular weight polyacrylic acid polymer. Performance of the former combination was close of that of a conventional phosphate-built product, currently under scrutiny on environmental grounds.

EXAMPLE 9

70% acrylic acid (AA) 30% styrene (all are % w/w's)

To a 2 liter glass reactor fitted with a water condenser, paddle stirrer and thermometer were added 240 g of deionized water and 240 g of IPA. This sealed flask was heated to reflux temperature (86° C.). At reflux a monomer solution comprising 298 9 AA, 102 g styrene and 1 g dodecyl mercaptan (DDM) and redox initiator solution of 1. deionized water 20 g, IPA 20 g and tertiary butyl hydrogen peroxide (TBHP) and 2. deionized water 80 g and formasul (SFS) 16 g were added concurrently, the monomer solution being added over 3 hours and the redox initiator solutions being added over 3.5 hours, maintaining reflux throughout. At the end of the additions the batch was held at reflux temperature for a further 1 hour.

At this point the batch was split into two equal portions A and B.

A. To 520 g of polymer solution 150 g of 47% caustic solution (85%) neutralized) was added with stirring with all of the solvents still present. (This amount caustic was chosen to give a final polymer pH of approx pH=7, although if desired all of the acid groups could be neutralized to give a final polymer pH-approx 9). The polymer solution went from clear to slightly opaque but no polymer precipitated out of solution. The batch was then stripping to remove the IPA cosolvent and water was added as a diluent.

The final polymer solution in water after all the cosolvent had been removed had a solids content of 41.2%, pH-7.1 and the polymer solution was transparent.

B. 200 g of deionized water was added to 520 g of the polymer solution containing cosolvents. A total of 230 g of distillate was removed from the polymer solution to remove all of the alcohol cosolvent. The polymer solution was then neutralized with 150 g of caustic solution to give a transparent polymer solution with solids=42.6% and pH=7.0.

EXAMPLE 10

60% acrylic acid (AA)/40% styrene (all are % w/w's)

To a 2 liter glass reactor fitted with a water condenser, paddle stirrer and thermometer were added 240 g of deionized water and 240 g of IPA. This sealed flask was heated to reflux temperature (86° C.). At reflux a monomer solution comprising 255 g AA, 170 g styrene and 1 g dodecyl mercaptan (DDM) and redox initiator solution of 1. deionized water 20 g, IPA 20 g and tertiary butyl hydrogen peroxide (TBHP) and 2. deionized water 80 g and formasul (SFS) 16 g were added concurrently, the monomer solution being added over 3 hours and the redox initiator solutions being added over 3.5 hours, maintaining reflux throughout. At the end of the additions the batch was held at reflux temperature for a further 1 hour.

At this point the batch was split into two equal portions A and B.

A. To 520 g of polymer solution 120 g of 47% caustic solution (85% neutralized) was added with stirring with all of the solvents still present. The polymer solution went from clear to very slightly hazy but no polymer precipitated out of solution. The batch was then stripped to remove the IPA cosolvent and water was added as a diluent The final polymer solution in water after all the cosolvent had been removed had a solids content of 36.1%, pH=7.2 and the polymer solution was transparent.

B. 200 g of deionized water was added to 520 g of the polymer solution containing cosolvents. A total of 230 g of distillate needed to be removed from the polymer solution to remove all of the alcohol cosolvent. After 220 g of distillate had been removed the polymer had substantially dropped out of solution preventing further stripping. At this point 120 g caustic was added with deionized water. The polymer redissolved back into solution and stripping was continued to give a transparent polymer solution having solids content 36.1%, pH=7.2. The polymer solution was then neutralized with 150 g of caustic solution to give a transparent polymer solution with solids=42.6% and pH=7.0.

EXAMPLE 11

50% acrylic acid (AA)/50% styrene (all are % w/w's)

To a 2 liter glass reactor fitted with a water condenser, paddle stirrer and thermometer were added 240 g of deionized water and 240 g of IPA. This sealed flask was heated to reflux temperature (86° C.). At reflux a monomer solution comprising 212 g AA, 212 g styrene and 1 g dodecyl mercaptan (DDM) and redox initiator solution of 1. deionized water 20 g, IPA 20 g and tertiary butyl hydrogen peroxide (TBHP) and 2. deionized water 80 g and formasul (SFS) 16 g were added concurrently, the monomer solution being added over 3 hours and the redox initiator solutions being added over 3.5 hours, maintaining reflux throughout At the end of the additions the batch was held at reflux temperature for a further 1 hour.

At this point the batch was split into two equal portions A and B.

A. To 520 g of polymer solution 106 g of 47% caustic solution (85% neutralized) was added with stirring with all of the solvents still present. The previously opaque polymer solution went transparent, i.e., the polymer became totally soluble in the cosolvent mixture and no polymer precipitated out of solution. The batch was then stripped to remove, the IPA cosolvent and water was added as a diluent.

The final polymer solution in water after all the cosolvent had been removed had a solids content of 33.8%, pH-7.4 and the polymer solution was transparent.

B. 200 g of deionized water was added to 520 g of the polymer solution containing cosolvents. A total of 230 g of distillate needed to be removed from the polymer solution to remove all of the alcohol cosolvent after 150 g of distillate had been removed the polymer had substantially dropped out of solution preventing further stripping. At this point 106 g caustic was added with deionized water. The polymer redissolved back into solution and stripping was continued to give a transparent polymer solution have solids content 32.9%, pH=7.5.

EXAMPLE 12

40% acrylic acid (AA)/60% styrene (all are % w/w's)

To a 2 liter glass reactor fitted with a water condenser, paddle stirrer and thermometer were added 240 g of deionized water and 240 g of IPA. This sealed flask was heated to reflux temperature (86° C.). At reflux a monomer solution comprising 170 g AA, 225 g styrene and 1 g dodecyl mercaptan (DDM) and redox initiator solution of 1. deionized water 20 g, IPA 20 g and tertiary butyl hydrogen peroxide (TBHP) and 2. deionized water 80 g and formasul (SFS) 16 g were added concurrently, the monomer solution being added over 3 hours and the redox initiator solutions being added over 3.5 hours, maintaining reflux throughout. At the end of the additions the batch was held at reflux temperature for a further 1 hour.

At this point the batch was split into two equal portions A and B.

A. To 520 g of polymer solution 80 g of 47% caustic solution (85% neutralized) was added with stirring with all of the solvents still present. The previously opaque polymer solution went transparent, i.e., the polymer became totally soluble in the cosolvent mixture and no polymer precipitated out of solution. The batch was then stripped to remove the IPA cosolvent and water was added as a diluent.

The final polymer solution in water after all the cosolvent had been removed had a solids content of 30.9%, pH=7.5 and the polymer solution was transparent B. 200 g of deionized water was added to 520 g of the polymer solution containing cosolvents. A total of 230 g of distillate needed to be removed from the polymer solution to remove all of the alcohol cosolvent. After 76 g of distillate had been removed the polymer had substantially dropped out of solution preventing further stripping. At this point 80 g caustic was added with deionized water. The polymer redissolved back into solution and stripping was continued to give a transparent polymer solution having solids content 30.5%, pH=7.5.

EXAMPLE 13

30% acrylic acid (AA)/70% styrene (all are % w/w's)

To a 2 liter glass reactor fitted with a water condenser, paddle stirrer and thermometer were added 240 g of deionized water and 240 g of IPA. This sealed flask was heated to reflux temperature (86° C.). At reflux a monomer solution comprising 102 g AA, 298 g styrene and 1 g dodecyl mercaptan (DDM) and redox initiator solution of 1. deionized water 20 g, IPA 20 g and tertiary butyl hydrogen peroxide (TBHP) and 2. deionized water 80 g and formasul (SFS) 16 g were added concurrently, the monomer solution being added over 3 hours and the redox initiator solutions being added over 3.5 hours, maintaining reflux throughout. At the end of the additions the batch was held at reflux temperature for a further 1 hour.

At this point the batch was split into two equal portions A and B.

A. To 520 g of polymer solution 54 g of 47% caustic solution (85% neutralized) was added with stirring with all of the solvents still present. The previously opaque polymer solution went transparent, i.e., the polymer because totally soluble in the cosolvent mixture and no polymer precipitated out of solution. The batch was then stripped to remove the IPA cosolvent and water was added as a diluent.

The final polymer solution in water after all the cosolvent had been removed had a solids content of 29.5%, pH=7.5 and the polymer solution was transparent.

B. 200 g of deionized water was added to 520 g of the polymer solution containing cosolvents. A total of 230 g of distillate needed to be removed from the polymer solution to remove all of the alcohol cosolvent, after 45 g of distillate had been removed the polymer had substantially dropped out of solution preventing further stripping. At this point 54 g caustic was added with deionized water. The polymer redissolved back into solution and stripping was continued to give a transparent polymer solution having solids content 28.7%, pH-7.7.

EXAMPLE 14

50% acrylic acid (AA)/50% styrene (all are % w/w's)

To a 2 liter glass reactor fitted with a water condenser, paddle stirrer and thermometer were added 240 g of deionized water and 240 g of IPA. This sealed flask was heated to reflux temperature (86° C.). At reflux a monomer solution comprising 212 g AA, 212 g styrene and 1 g dodecyl mercaptan (DOM) and redox initiator solution of 1. deionized water 20 g, IPA 20 g and tertiary butyl hydrogen peroxide (TBHP) and 2. deionized water 80 g and formasul (SFS) 16 g were added concurrently, the monomer solution being added over 3 hours and the redox initiator solutions being added over 3.5 hours maintaining reflux throughout. At the end of the additions the batch was held at reflux temperature for a further 1 hour.

At this point the batch was split into two equal portions A and B.

A. To 520 g of polymer solution 38 g of 47% caustic solution (20% neutralized) was added with stirring with all of the solvents still present. The previously opaque polymer solution remained opaque, i.e., the polymer did not fully solubilize in the cosolvent mixture. No polymer precipitated out of solution. The batch was then stripped to remove the IPA cosolvent and water was added as a diluent.

The final polymer solution in water after all the cosolvent had been removed was viscous and opaque and became solid on cooling.

B. To 520 g of polymer solution 25 g of polymer solution 25 g of 47% caustic solution (30% neutralized) was added with stirring with all of the solvents still present The previously opaque polymer solution remained opaque, i.e., the polymer did not fully solubilize in the cosolvent mixture. No polymer precipitated out of solution. The batch was then stripped to remove the IPA cosolvent and water was added as a diluent.

The final polymer solution in water, after all the cosolvent, had been removed, was viscous and opaque and became solid on cooling.

EXAMPLE 15

40% acrylic acid (AA)/60% sytrene (all are % w/w's)

To a 2 liter glass reactor fitted with a water condenser, paddle stirrer and thermometer were added 240 g of deionized water and 240 g of IPA. This sealed flask was heated to reflux temperature (86° C.). At reflux a monomer solution comprising 170 g AA, 255 g styrene and 1 g dodecyl mercaptan (DOM) and redox initiator solution of 1. deionized water 20 g, IPA 20 g and tertiary butyl hydrogen peroxide (TBHP) and 2. deionized water 80 g and formasul (SFS) 16 g were added concurrently, the monomer solution being added over 3 hours and the redox initiator solutions being added over 3.5 hours maintaining reflux throughout. At the end of the additions the batch was held at reflux temperature for a further 1 hour.

At this point the batch was split into two equal portions A and B.

A. To 520 g of polymer solution 20 g of 47% caustic solution (20% neutralized) was added with stirring with all of the solvents still present. The previously opaque polymer solution remained opaque, i.e., the polymer did not fully solubilize in the cosolvent mixture. No polymer precipitated out of solution. The batch was then stripped to remove the IPA cosolvent and water was added as a diluent. Some polymer precipitated out of solution during the distillation making the remainder of the distillation step problematic.

The final polymer solution in water, after all the cosolvent had been removed, was opaque and semi-precipitated. The batch became solid on cooling.

B. To 520 g of polymer solution 30 g of 47% caustic solution (30% neutralized) was added with stirring with all of the solvents still present. The previously opaque polymer solution remained opaque, i.e., the polymer did not fully solubilize in the cosolvent mixture. No polymer precipitated out of solution. The batch was then stripped to remove the IPA cosolvent and water was added as a diluent. Some polymer precipitated out of solution during the distillation making the remainder of the distillation step problematic.

The final polymer solution in water, after all the cosolvency had been removed, was opaque and semi-precipitated. The batch became solid on cooling.

What is claimed:

1. A polymer, characterized in that it is prepared by a solution polymerization method comprising the steps of:
   (a) polymerizing a monomer selected from the group consisting of styrene and substituted-styrene and a carboxylated monomer, in the presence of a water-miscible solvent, thereby producing a polymer solution containing acid moieties,
   (b) before any water miscible solvent removal, neutralizing at least 30 weight percent of the acid moieties in the polymer solution; and
   (c) removing the water-miscible solvent from the polymer solution.

2. The polymer of claim 1 wherein up to 1 weight percent of n-dodecyl mercaptan monomer is added to the polymerization step (a).

3. The polymer of claim 1 having a molecular weight of from 500 to 10,000.

4. The polymer of claim 1 wherein from 40 to 90 weight percent of the monomer selected from the group consisting of styrene and substituted-styrene and 50 to 10 weight percent of the carboxylated monomer, based on the total weight of monomer, are polymerized in the presence of the water-miscible solvent.

5. The polymer of claim 4 comprising the polymerized residue of at least 90 weight percent of the monomers selected from the group consisting of styrene, substituted-styrene and carboxylated monomers.

6. The polymer of claim 5 wherein the carboxylated monomer is selected from the group consisting of acrylic acid, methacrylic acid, maleic acid and the half esters thereof, crotonic acid and itaconic acid.

7. The polymer of claim 6 comprising at least 90 weight percent of the monomers selected from the group consisting of styrene and acrylic acid.

8. The polymer of claim 1 wherein from 50 to 90 weight percent of the monomer selected from the group consisting of styrene and substituted-styrene and 50 to 10 weight percent of the carboxylated monomer, based on the total weight of monomer, are polymerized in the presence of the water-miscible solvent.

9. The polymer of claim 8 wherein at least 50 weight percent of the acid moieties in the polymer solution are neutralized prior to removal step (c).

10. The polymer of claim 1 wherein from 60 to 90 weight percent of the monomer selected from the group consisting of styrene and substituted-styrene and 40 to 10 weight percent of the carboxylated monomer, based on the total weight of monomer, are polymerized in the presence of the water-miscible solvent and at least 75 weight percent of the acid moieties in the polymer solution are neutralized prior to removal step (c).

11. The polymer of claim 10 comprising the polymerized residue of from 75 to 90 weight percent of the monomer selected from the group consisting of styrene and substituted-styrene.

* * * * *